US007189913B2

(12) United States Patent
Moulios et al.

(10) Patent No.: US 7,189,913 B2
(45) Date of Patent: Mar. 13, 2007

(54) METHOD AND APPARATUS FOR TIME COMPRESSION AND EXPANSION OF AUDIO DATA WITH DYNAMIC TEMPO CHANGE DURING PLAYBACK

(75) Inventors: Christopher Moulios, Cupertino, CA (US); Sol Friedman, Sunnyvale, CA (US)

(73) Assignee: Apple Computer, Inc., Cupertino, CA (US)

(*) Notice: Subject to any disclaimer, the term of this patent is extended or adjusted under 35 U.S.C. 154(b) by 708 days.

(21) Appl. No.: 10/407,837

(22) Filed: Apr. 4, 2003

(65) Prior Publication Data

US 2004/0196988 A1 Oct. 7, 2004

(51) Int. Cl.
*G01H 7/00* (2006.01)
*G01H 1/08* (2006.01)

(52) U.S. Cl. .......................................... 84/612; 84/625

(58) Field of Classification Search ................. 84/625, 84/612, 652, 660
See application file for complete search history.

(56) References Cited

U.S. PATENT DOCUMENTS

| | | | | |
|---|---|---|---|---|
| 5,386,493 | A * | 1/1995 | Degen et al. | 704/267 |
| 5,842,172 | A | 11/1998 | Wilson | 704/503 |
| 6,169,240 | B1 | 1/2001 | Suzuki | 84/605 |
| 6,232,540 | B1 * | 5/2001 | Kondo | 84/612 |
| 6,534,700 | B2 | 3/2003 | Cliff | 84/603 |
| 6,801,898 | B1 * | 10/2004 | Koezuka | 704/500 |
| 6,889,193 | B2 * | 5/2005 | McLean | 704/500 |
| 2001/0017832 | A1 * | 8/2001 | Inoue et al. | 369/53.34 |
| 2001/0039872 | A1 * | 11/2001 | Cliff | 84/609 |
| 2003/0050781 | A1 * | 3/2003 | Tamura et al. | 704/267 |
| 2004/0122662 | A1 | 6/2004 | Crockett | 704/200.1 |
| 2004/0254660 | A1 * | 12/2004 | Seefeldt | 700/94 |

OTHER PUBLICATIONS

Moller-Nielson, P. et al, "Time-Stretching with a Time Dependent Stretch Factor" Aarhus University (Oct. 22, 2002) 4 pages.

* cited by examiner

*Primary Examiner*—Jeffrey W Donels
(74) *Attorney, Agent, or Firm*—Hickman Palermo Truong & Becker LLP

(57) ABSTRACT

A method and apparatus implement time compression and expansion of audio data, with dynamic tempo change during playback. Dynamic changes in tempo are implemented at specific points in the audio signal corresponding to local minimums in the fade-in and fade-out characteristics of the compression/expansion scheme. An audio signal is marked to define temporal slices of audio data. Mark positions may be selected to minimize significant transient activity midway between consecutive marks. Fade-in and fade-out functions are associated with the leading side and trailing side, respectively, of each mark, creating a series of cross-fading "mounds" with peaks at each mark. When a tempo change is requested (e.g., a user selects a new tempo value in a user interface), the tempo change is delayed until the start of the next "mound" (i.e., the next fade-in). Thus, despite the tempo change, each mound uses a contiguous set of audio data, preventing the clicks and pops associated with skips in the audio data. Cross-fading minimizes any effects of desynchronization caused by overlapping mounds of differing speeds.

21 Claims, 8 Drawing Sheets

METHOD AND APPARATUS FOR TIME COMPRESSION AND EXPANSION OF AUDIO DATA WITH DYNAMIC TEMPO CHANGE DURING PLAYBACK

FIELD OF THE INVENTION

The present invention relates generally to audio processing applications, and more particularly to a method and apparatus for adjusting the tempo of audio data.

BACKGROUND ART

With the proliferation of personal computers into the homes of consumers, media activities formerly reserved to professional studios have migrated into the household of the common computer user. One such media activity is the creation and/or modification of audio files (i.e., sound files). For example, sound recordings or synthesized sounds may be combined and altered as desired to create standalone audio performances, soundtracks for movies, voiceovers, special effects, etc.

To synchronize stored sounds, including music audio, with other sounds or with visual media, it is often necessary to alter the tempo (i.e., playback speed) of one or more sounds. Changes in tempo may also need to be made dynamically, during playback, to achieve the desired listening experience. Unfortunately, straightforward approaches to implementing tempo changes, including merely playing the given sound at a faster or slower rate, result in undesired audible side effects such as pitch variation (e.g., the "chipmunk" effect of playing a sound faster) and clicks and pops caused by skips in data as the tempo is changed. These problems may be better understood in the context of an audio file example.

An audio file generally contains a sequence (herein referred to as an "audio sequence") of digital audio data samples that represent measurements of amplitude at constant intervals (the sample rate). In a computer system, this audio sequence is often represented as an array of data like the following:

SourceAudioData[]={0.0, 0.2, 0.4, 0.3, 0.2, −0.04, −0.15, −0.2, −0.15, −0.05, 0.1, . . . }

FIGS. 1A–1C show a sound waveform example as might be stored in an audio file. FIG. 1A represents 2000 milliseconds of audio in waveform 100. FIG. 1B represents 200 milliseconds of audio taken from the beginning of waveform 100 and shown in expanded view. FIG. 1C shows 10 milliseconds of audio in an even greater expanded view, showing individual samples associated with waveform 100.

In FIG. 1A, waveform 100 contains ten occurrences of sharp rises in signal value that taper over time. These occurrences are referred to herein as transients and represent distinct sound events, such as the beat of a drum, a note played on a piano, a footstep, or a syllable of a vocalized word. FIG. 1C illustrates how these sound events, or transients, are represented by the sequence of samples stored in an audio file. It should be clear that modifying the sample values or the time-spacing of the samples in FIG. 1C will result in a change in the transient behavior at the level of FIG. 1A, and a corresponding change in the associated sound during playback of the audio sequence.

The resolution of FIG. 1B highlights the periodic nature of waveform 100 during the first transient. The frequency of this periodicity influences the pitch of the sound resulting from that transient. A faster oscillation provides a higher pitched sound, and a slower oscillation provides a lower pitched sound. Also clear from FIG. 1B is the continuous nature of waveform 100. Discontinuities in waveform 100 would be audible on playback as clicks and pops in the audio.

Assuming that waveform 100 represents an adult speaking, if an audio enthusiast attempts to fit the audio sequence into a 1500 millisecond timeslot (e.g., to synchronize the audio sequence with another musical audio sequence) by simply playing back the samples at 4/3 speed, then the result will sound like a child's voice. This occurs because the frequency behavior of the transients speeds up with the playback rate, causing an increase in pitch. This same phenomenon occurs when the incorrect playback speed is selected on a dual-speed tape recorder.

Now assuming that the audio enthusiast only wishes to speed up a portion of the audio file, not only will the pitch change when the speed is changed, but the speed transition will be marked by a click as the continuity of the waveform is temporarily disrupted by the output waveform skipping forward. Neither the pitch change nor the audible clicking are desirable from a listening standpoint, particularly if the audio is to be of professional quality. Clearly, a mechanism is needed for providing tempo (i.e., speed) control without the undesired side effects of pitch variations and audible clicks or pops.

SUMMARY OF THE INVENTION

A method and apparatus for performing time compression and expansion of audio data, with dynamic tempo change during playback, are described. Prior tempo adjustment schemes create undesired clicks and pops at tempo changes, caused by jumping and skipping in the audio playback signal where such changes occur. Embodiments of the invention avoid undesired pops and clicks by maintaining contiguous audio data for playback during significant audio transient activity. Dynamic changes in tempo are implemented at specific points in the audio signal corresponding to local minimums in the fade-in and fade-out characteristics of the compression/expansion scheme. In one or more embodiments, the compression/expansion scheme is substantially pitch-independent.

In accordance with one or more embodiments of the invention, an audio signal is marked to define temporal slices of audio data. In a preferred embodiment, marking may be performed to minimize significant transient activity midway between consecutive marks. A fade-in function is associated with the leading side of each mark, and, similarly, a fade-out function is associated with the trailing side of each mark, creating a series of cross-fading "mounds" with peaks at each mark. "Cross-fading" refers to the overlapping of the fade-out associated with each mound with the fade-in of a following mound to smooth the transition between respective transient activity associated with each mark.

In accordance with one or more embodiments, when a tempo change is requested (e.g., a user selects a new tempo value in a user interface), the embodiment delays implementing the tempo change until the start of the next "mound" (i.e., the next fade-in). Thus, despite the tempo change, each mound uses a contiguous set of audio data, preventing the clicks and pops associated with skips in the audio data. Cross-fading minimizes any effects of desynchronization caused by overlapping mounds of differing speeds.

DETAILED DESCRIPTION OF THE INVENTION

Figures 1A, 1B, 1C:
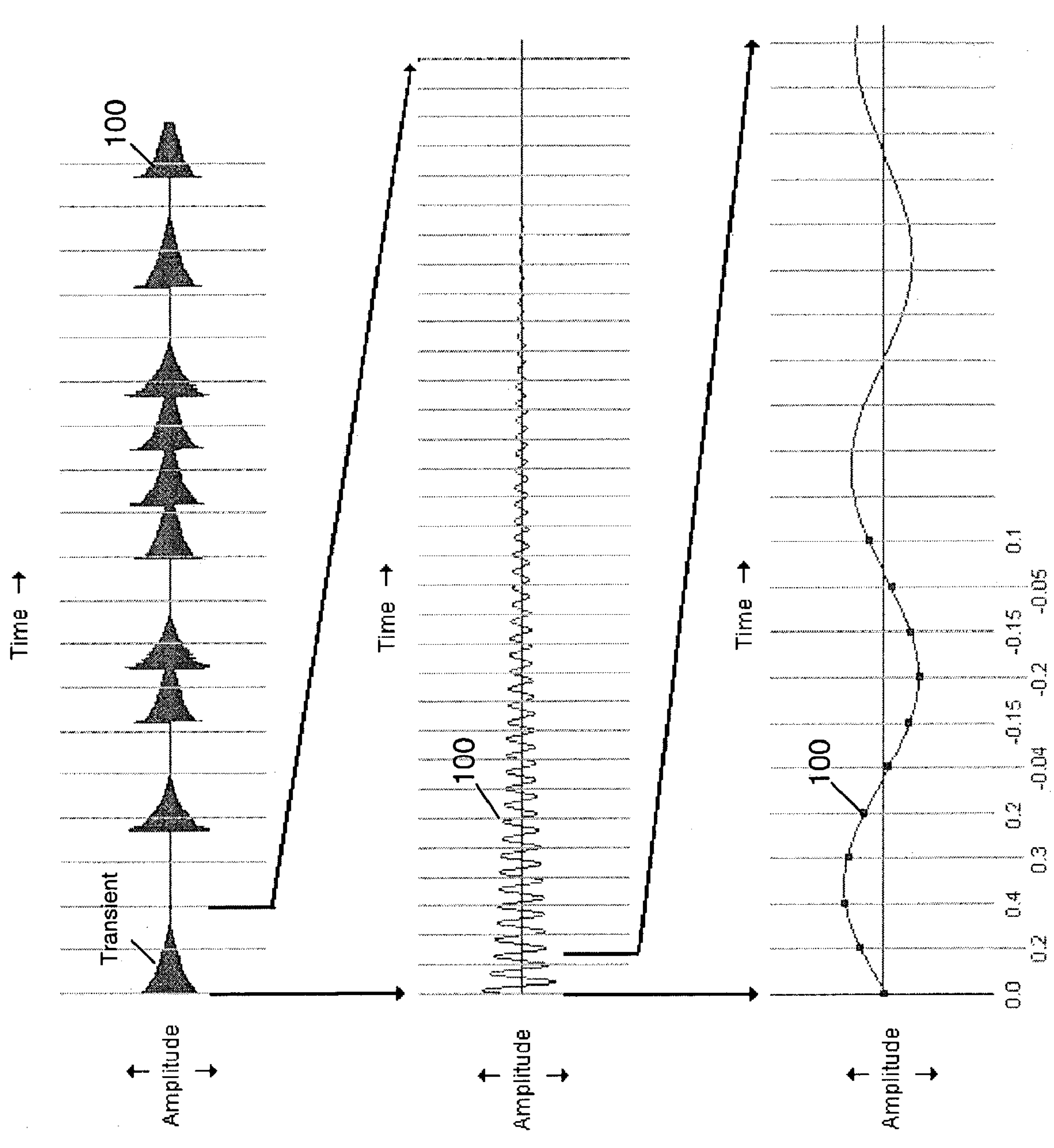
FIGS. 1A–1C are waveform diagrams illustrating the behavior of a sample audio waveform over time.

The present invention is a method and apparatus for performing time compression and expansion of audio data, with dynamic tempo change during playback. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Embodiments of the invention may include mechanisms or steps that provide substantial pitch independence in the process of altering the playback speed of audio data. For example, regions of audio data with greater influence on the listening experience (e.g., locations of greater transient activity and/or signal power) are identified, and, to the extent possible, the frequency characteristics of those audio regions are maintained regardless of the selected playback speed. Pitch variations can thus be avoided.

The original audio signal is processed as a sequence of transient events that may be pushed apart or compressed together as needed to meet the desired tempo. To avoid clicks and pops from instantaneous skips in the audio data, tempo changes are implemented only at the beginning of a new transient event. For example, when a tempo increase is signaled during a first transient event, the first transient is processed to completion without change. The leading edge of the following transient event, however, is moved closer to the first transient event (i.e., closer in time) to provide the increase in tempo. A cross-fading function provides smoothing of the transition between the trailing edge of the first transient event and the leading edge of its successor.

Parsing Audio Data Into Slices

In one or more embodiments of the invention, audio data is processed in units of consecutive audio samples referred to herein as “slices.” The number of samples in each slice depends on the temporal length of the slice (e.g., the number of milliseconds in each slice), as well as the sample rate of the original audio data (e.g., 44 kHz=44,000 samples per second or 44 samples per millisecond). Embodiments of the present invention may be practiced with any slice length or sample rate. However, preferred criteria are that the length of each slice be sufficiently large to cause only minimal frequency distortion in the audible playback signal, yet sufficiently small to avoid any rhythmic distortion. This preferred criteria can be expressed as: $f_{sound}$>>(slices per second)≧$f_{beat}$. For example, a typical slicing rate can be, but is not limited to, the range of 1–40 Hz (slices per second).

Embodiments of the invention implement a cross-fading scheme that maintains signal fidelity at the beginning and end of each slice, while sacrificing the fidelity of audio data in the middle of the slice, where necessary to modify playback tempo. Because fidelity of audio data in the middle of a slice may be reduced, it is preferable that the original audio data be parsed into slices that minimize the amount of significant transient activity near the middle of each slice.

Figure 2A:
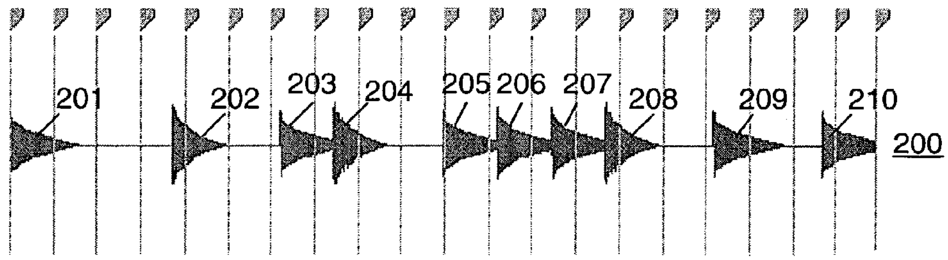
FIG. 2A is a waveform diagram illustrating a slicing method for parsing audio data at a constant rate, in accordance with one or more embodiments of the invention.
Figure 2B:
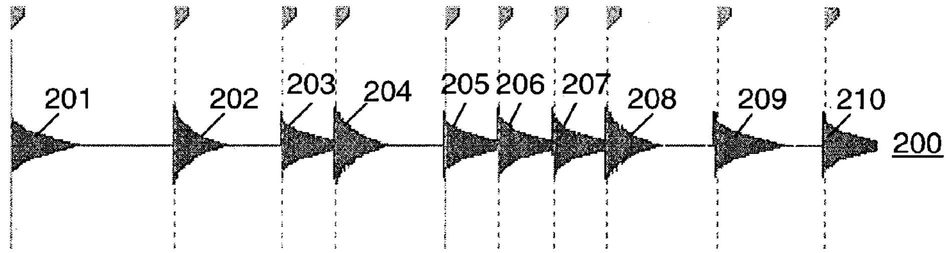
FIG. 2B is a waveform diagram illustrating a slicing method for parsing audio data based on transient detection, in accordance with one or more embodiments of the invention.
Figure 2C:
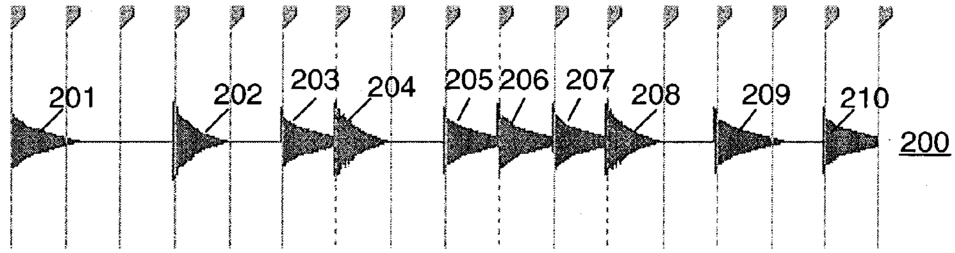
FIG. 2C is a waveform diagram illustrating a slicing method for parsing audio data based on musical characteristics, in accordance with one or more embodiments of the invention.

FIGS. 2A–2C illustrate three methods for parsing an audio data sequence into slices. In each of the parsing methods, the audio sequence is marked in some fashion to delineate slice boundaries. Each figure shows signal strength over time for an audio sequence 200. Audio sequence 200 comprises transients (“transient events”) 201–210, each transient representing, for example, a note played by an instrument.

In FIG. 2A, audio sequence 200 is marked at an arbitrary constant rate (e.g., 20 slices per second). The constant marking rate allows every slice to be treated similarly (e.g., no need to track the length of each slice in the original audio data). However, as shown in FIG. 2A, the arbitrary selection of the marking rate (and phase) can result in the occurrence of significant transient activity in the center of some slices (e.g., transients 204, 207 and 208 begin in the middle of defined slices). Thus, as the tempo is changed, transients 204, 207 and 208 may experience some distortion due to cross-fading.

Marking schemes may also use detection schemes based on amplitude and/or frequency changes in the audio sequence. FIG. 2B illustrates marking of audio sequence 200 based upon the detection of transients. Transient detection uses power analysis to mark where the audio sequence has the largest changes in signal energy. Generally, the largest energy change corresponds to the beginning of a transient, also known as the “attack.”

As shown in FIG. 2B, audio stream 200 is marked on or about the beginning of each of transients 201–210. As opposed to the constant slice length used in FIG. 2A, the transient detection of FIG. 2B results in varying slice lengths. In embodiments solely using transient detection to define slices, the length of each slice (or the marking positions) may be stored or tracked in memory to facilitate proper processing of each respective slice during playback.

FIG. 2C illustrates marking audio sequence 200 into musical time slices. Because music typically has predictable rhythmic characteristics (apart from slight performance inflections), musical audio sequences are more amenable than random sound sequences to time-based parsing. For example, assuming that audio sequence 200 is one measure (a musical unit having a prescribed number of beats) of music in what is referred to as 4/4 time (i.e., four beats per measure, with a quarter note getting one beat), then slices may be defined by marks at intervals corresponding to the duration and phase of a small, music-based unit of time, such as a sixteenth note (one-sixteenth of a measure). A resolution corresponding to a sixteenth note is sufficient for most musical audio sequences, though it will be understood that other resolutions (e.g., thirty-second notes, etc.) may also be used in other embodiments of the invention.

Given an audio music sequence and an associated rhythm and time description (e.g., starting tempo of 120 beats per minute, 4/4 time, etc.), such as from meta data or user input, an audio processing program can approximate suitable marks in the audio sequence (e.g., the above example may be marked on the sixteenth note boundaries, with one slice every 125 milliseconds). In FIG. 2C, the "attack" of each of transients 201–210 begins on or near the boundary of a slice (though the transients may or may not end near a slice boundary). Also, because the marks are based on constant slice lengths and not on actual transient occurrences, some slices contain no transients.

In addition to the individual parsing schemes shown in FIGS. 2A–2C, a user's input may be used to specify slices, for example, by inputting or selecting, via a user interface in the audio processing system, a slice length in time or samples. Also, a graphic representation of the audio sequence, similar to that shown in FIGS. 2A–2C, may be displayed to a user, allowing a user to mark the sequence manually by, for example, clicking a mouse cursor on the sequence representation at a desired marking point along the time line.

Other embodiments of the invention may use parsing schemes beyond those previously described, or multiple parsing schemes may be combined. For example, transient detection may be used to insure that musical time slices are in proper phase, to extract an estimate of the initial tempo if one is not provided, or to combine empty slices with a preceding transient-filled slice to form a larger slice in a variable slice length implementation.

Cross-Fading Within A Slice

As previously indicated, embodiments of the present invention use cross-fading within each slice to seamlessly blend two transients together. The cross-fading method uses a fade-in function, which begins at zero value and increases to a value of one, and a fade-out function, which begins at a value of one and decreases to zero value. In general terms, the fade-out function is used to scale the sample values of the trailing portion of the transient associated with the earlier marker. Similarly, the fade-in function is used to scale the sample values associated with the leading portion of the transient associated with the later marker. The scaled results of both functions are combined (e.g., using addition) to achieve the sample sequence for the output slice.

The actual fade-in and fade-out functions may vary for different embodiments. For example, the fade functions may be linear, exponential or non-linear. A preferred embodiment uses curves that approximate equal power over time when combined. The length of the fade-in and fade-out functions is generally equal to the output slice length. Some embodiments of the invention may use fade-in and fade-out lengths shorter than the output slice length, where some overlap of the fade-in and fade-out functions remains to provide the desired blending effect of the cross-fade.

Figure 3:
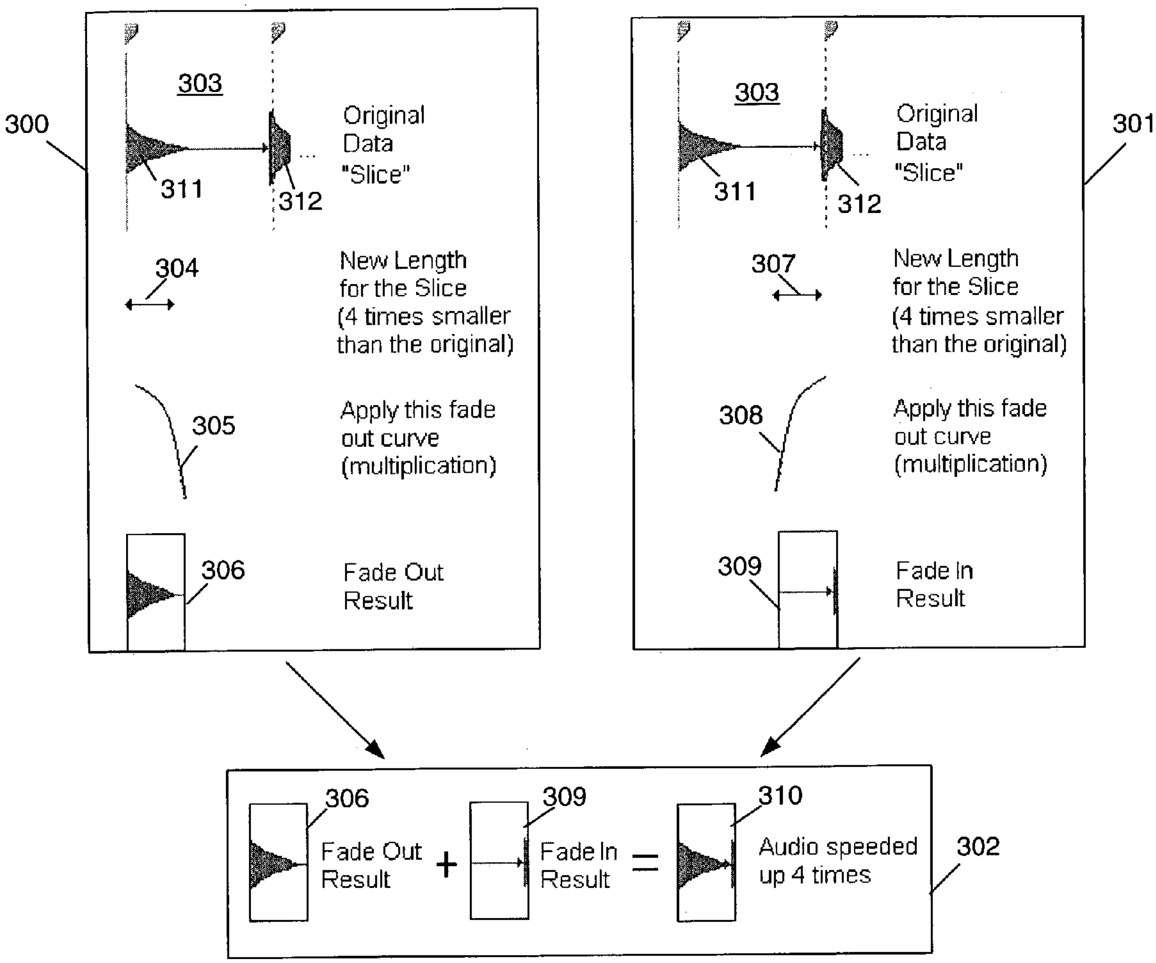
FIG. 3 is a process diagram illustrating a process for cross-fading within a slice of audio data, in accordance with one or more embodiments of the invention.

FIG. 3 illustrates a sample application of a cross-fade to a slice of original sample data to create an output slice at four times the tempo (i.e., new slice length is one-fourth the slice length of original data). Elements 300 and 301 illustrate the fade-out and fade-in processes, respectively, whereas element 302 illustrates the process of combining the fade-in and fade-out results.

In fade-out process 300, original data slice 303 (of length N samples) contains transient 311 associated with the left-most mark and transient 312 associated with the right-most mark. Transient 312 lies primarily in the following slice, but a small lead-in portion rests within slice 303. The designated speed factor in this example is four (4.0). Thus, a new output slice region 304 is calculated as N/4 samples (i.e., original slice length/speed factor) in length. For the fade-out process, the fade-out function 305 is aligned with the beginning of the original slice 303, with the fading completed within the new slice length of region 304 (i.e., completed N/4 samples from the beginning of slice 303 or within the first quadrant of original slice 303). Multiplying the data of the original slice 303 by the derived fade-out function 305 yields fade-out result 306, which primarily contains a representation of the trailing portion of transient 311 forced to zero value within N/4 samples. Note that this process may change the duration of transient 311, but it maintains the frequency characteristics of transient 311 that determine pitch.

In fade-in process 301, a new output slice region 307 is calculated as N/4 samples, beginning N/4 samples before the right marker and completing on the right marker (i.e., the last quadrant of original slice 303). The fade-in function 308 is aligned with region 307, with the fade-in completed by the end of slice 303. Multiplying the data of the original slice 303 by the derived fade-in function 308 yields fade-in result 309 of length N/4 samples, which primarily contains a representation of the leading portion of transient 312.

Combination process 302 obtains fade-out result 306 and fade-in result 309, aligns them in time, and adds the fade-out and fade-in results together. The sum of the fade-out and fade-in results forms output slice 310. Output slice 310 contains one-fourth the number of samples of original slice 303, and thus provides playback at four times the speed of the original audio data, as desired in this example. Despite containing seventy-five percent less data than original slice 303, output slice 310 retains the most significant transient activity of the original, with the associated frequency characteristics intact.

Dynamic Tempo Change During Audio Playback

Figure 4:
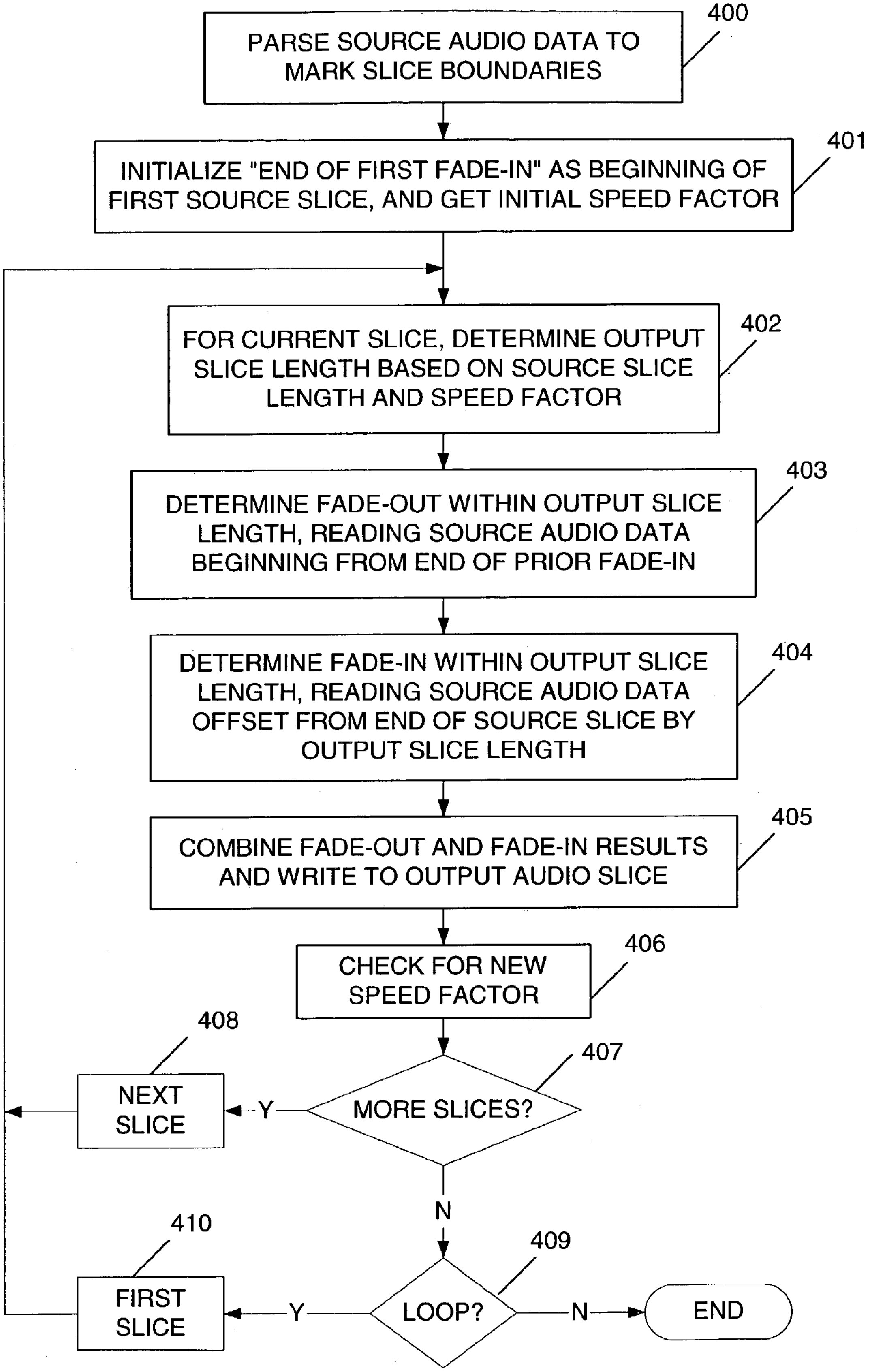
FIG. 4 is a flow diagram illustrating a method for processing audio data with dynamic tempo changes, in accordance with one or more embodiments of the invention.

FIG. 4 illustrates a general flow diagram of one embodiment of a process for playing back an audio sequence with dynamic tempo changes. The method shown assumes that parsing of the original audio sequence is completed before slice processing begins during playback. In other embodiments, the parsing may be performed one slice at a time and thus be embedded within a per-slice cross-fading loop (particularly if the parsing is performed at a constant rate that only requires incrementing a prior value by a constant value). Parsing may also be performed in a parallel computer application, process or thread that provides slice markers to the application, process or thread implementing cross-fades.

In step 400 of FIG. 4, the original audio data sequence or stream is parsed into time slices for processing, using, for example, one or more of the parsing schemes previously described. In step 401, prior to beginning the cross-fade processing loop, the value for the "end of first fade-in"

sample location is initialized to the beginning of the first source slice. Also, an initial speed factor is determined (e.g., by program default or a preset user value).

Given the source slice length of the original audio data sequence and a current speed factor, the output slice length (e.g., in samples or time units) of the current slice is calculated in step 402:

"output slice length"="original slice length"/"speed factor"

where

"speed factor"="new tempo"/"original tempo"

In step 403, the fade-out of a current transient is calculated using the specified fade-out function and the output slice length as previously calculated. The original data read for the fade-out determination begins at the end of a fade-in from the prior slice (i.e., at the left marker or slice boundary), so that there is no discontinuity in the sequence of data read.

In step 404, the fade-in of the next transient is calculated using the specified fade-in function. The fade-in data read from the original audio sequence begins at the sample or time value corresponding to the right marker or slice boundary less the output slice length (i.e., the output slice length determines the read offset into the original data). The transition of initiating the fade in data is minimized by the fade-in function, making the initiation of a fade-in a suitable point in time to change speed or tempo of the playback. The revised read offset caused by the speed change is effectively hidden.

In step 405, the fade-in and fade-out results of steps 403 and 404 are combined (via addition) to yield the destination audio data of the output slice. Steps 403–405 thus perform the desired cross-fade. For explanatory simplicity, this embodiment shows fade-in and fade-out calculations being performed to completion before combination occurs. Other embodiments may perform fade-in, fade-out and combination calculations one sample at a time (as in the computer code example discussed below).

After the cross-fading of the current slice is complete, at step 406, the playback process may query whether a new speed factor has been introduced by a speed change request during the processing of the current slice. If so, that new speed factor will take effect in the processing of the next slice. Alternatively, the speed change may be spaced over several slices (e.g., possibly, though not necessarily consecutive slices) for a smoother ramping up (or down) of tempo. For example, a change from a speed factor of 1.2 to 4.8 may first transition from 1.2 to 2.4, then from 2.4 to 4.8 at a later slice. Any such one-step or multi-step speed transitions are within the scope of the present invention.

By checking for speed changes at the end of each slice, speed changes may be delayed up to one full slice length from when those changes are first requested. For most applications, this delay is of negligible consequence (e.g., delay on the order of 50 milliseconds). This delay insures that the speed change occurs at the beginning of a fade-in where a skip in read offsets is muted by the fade-in function.

After the speed factor query, if there are more slices to process, step 407 branches to step 408 where the next slice is designated as the new "current" slice, and the method flow returns to step 402 to begin processing the new slice. If, at step 407, there are no further slices, then, at step 409, if the audio playback is not set to create an audio loop, the method ends. However, if the audio playback is set to create an audio loop, then the first slice of audio data is again designated as the "current" slice, and processing continues at step 402. The following is a sample of computer pseudocode that implements steps 401–408 (i.e., slice processing for playback), in accordance with an embodiment of the invention.

```
function float FadeInMultiplierFunction( position, length)
{
    return sqrt( position / length);
}
function float FadeOutMultiplierFunction ( position, length)
{
    return sqrt( 1.0 − (position / length));
}
function stretch( PositionMarkers[ ], SourceAudioData[ ],
                        DestinationAudioData[ ])
{
    OutPosition = 0;
    EndOfLastFadeIn = 0;
    speed = getInitialSpeed( );
    for n = 0 to number of PositionMarkers − 1
        {
        OldSliceLength = PositionMarkers [n+1] −
        PositionMarkers [n];
        NewSliceLength = OldSliceLength / speed;
        for i = 0 to NewSliceLength
            {
            AudioFadingOut = SourceAudioData
            [ EndOfLastFadeIn + i] *
                    FadeOutMultiplierFunction
                    ( i, NewSliceLength);
            AudioFadingIn = SourceAudioData
            [ PositionMarkers [n+1] −
                    NewSliceLength + i] *
                    FadeInMultiplierFunction
                    ( i, NewSliceLength);
            DestinationAudioData[OutPosition] =
            AudioFadingOut +
                    AudioFadingIn;
            OutPosition = OutPosition + 1;
            }
        EndOfLastFadeIn = PositionMarkers[n+1];
        speed = GetNewSpeed( );
        }
}
```

In the above code segment, the functions "FadeInMultiplierFunction" and "FadeOutMultiplierFunction" represent the fade-in and fade-out functions, respectively, that are used to cross-fade the audio data. Those functions take a "position" value and a "length" value as inputs and generate a single floating-point value for multiplying with the audio data at the sample point designated by the integer "position." The integer "length" specifies the length, in samples, of the entire fade function for the given slice.

The function "stretch" is the main loop for processing slices during playback. The function call for "stretch" has three arrays for parameters. The "PositionMarkers" array contains an array of sample numbers (integers) corresponding to parsing markers (i.e., slice boundary marks). For example, if PositionMarkers[0–2] contain the values "1", "51" and "101", then the first, second and third slices of audio data in the original audio sequence begin at sample 1, sample 51 and sample 101, respectively. A parsing function would fill this array with values prior to "stretch" being called. Some embodiments may not require that all marker values be stored in an array, e.g., because the marker values may be trivially determined using an incrementing mechanism. However, generalizing with the use of this array allows the code segment to handle parsing schemes with variable slice lengths.

The array "SourceAudioData" contains the original audio data sequence (e.g., floating-point sample values) indexed by sample number. Prior to calling "stretch", "SourceAudioData" may be loaded with data from an audio file, or audio data-created or captured in an audio application (possibly the same application containing "stretch").

The array "DestinationAudioData" represents the processed audio data to be output during playback. The function "stretch" reads original audio data out of "SourceAudioData" and writes the cross-faded slice data into "DestinationAudioData".

The function "stretch" contains two nested loops. The outer loop steps through a new slice of "SourceAudioData" with each iteration, checking for a new "speed" value at the end of each cycle (may alternatively check at the beginning of each cycle). The inner loop steps through pairs of samples to be cross-faded, with the single sample result of each iteration written to "DestinationAudioData". The data sample to be faded out is initially read from the current position marker location (i.e., beginning of the slice). Subsequent iterations of the inner loop cycle through consecutive samples in "SourceAudioData" for the length of the calculated output slice length, forming a contiguous sequence of read data from the fade-in data of the prior slice. The data sample to be faded in is initially offset in time from the right position marker (i.e., the end of the slice) by the length of the new output slice. Further cycles read contiguous "SourceAudioData" samples for fade-in through the end of the slice.

Figure 5:
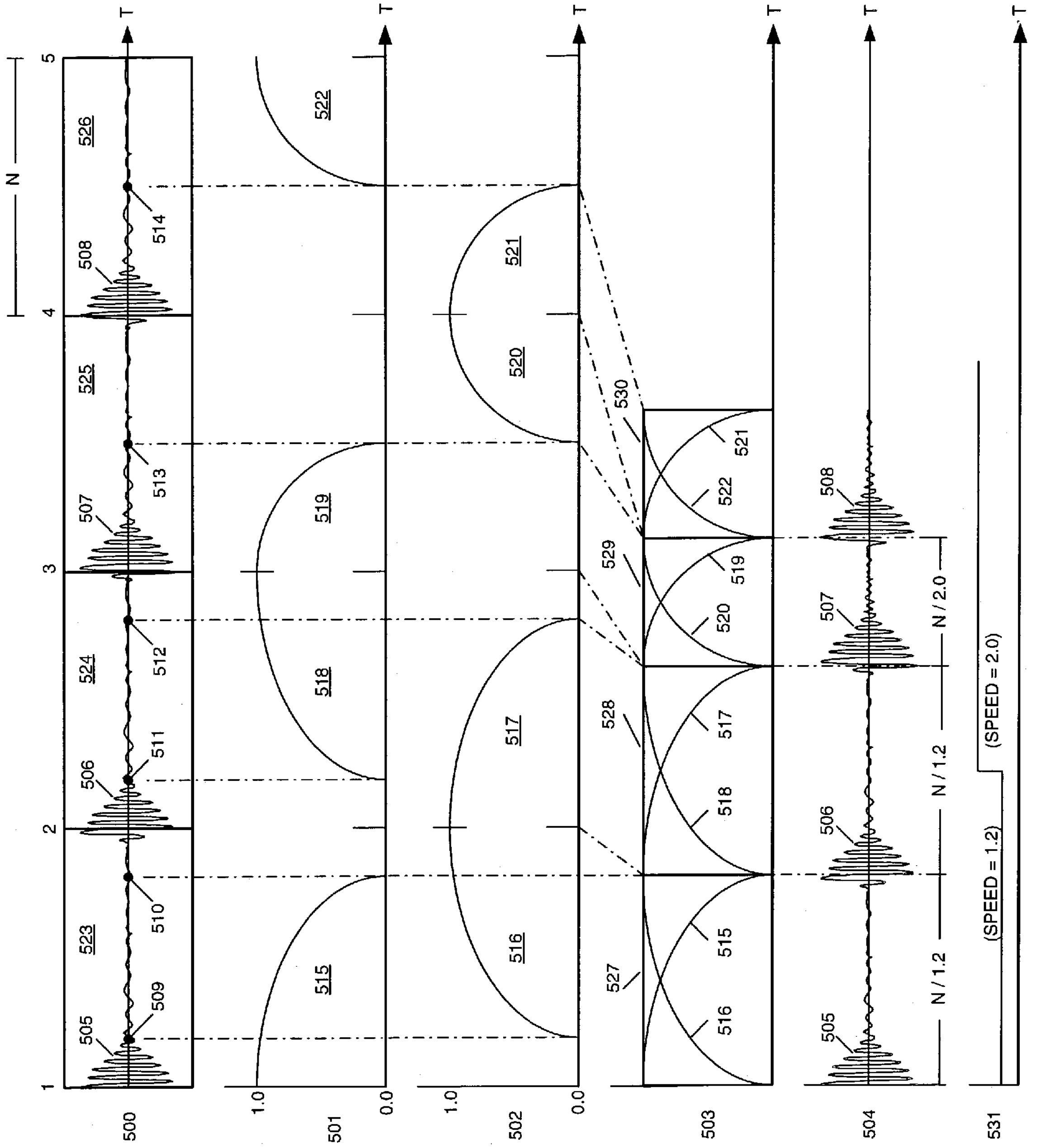
FIG. 5 is a timing diagram illustrating time compression with a dynamic tempo change during playback of audio data, in accordance with one or more embodiments of the invention.

FIG. 5 illustrates the application of a dynamic tempo change in accordance with one or more embodiments of the invention. In this example, as shown by speed control waveform 531, the starting speed factor is 1.2, with a speed change input for a speed factor of 2.0 occurring during processing of slice 524. (For example, control waveform 531 may be, but is not limited to, a real-time user input, a pre-programmed speed parameter, or an automated control parameter such as a synchronization system feedback signal.) Implementation of the speed change is withheld until processing of subsequent slice 525.

In FIG. 5, waveform 500 represents a source audio data sequence parsed into four slices 523–526 having N samples each. Transients 505–508 are associated with slices 523–526, respectively. Waveforms 501 and 502 illustrate cross-fade functions used to process audio sequence 500. Waveform 503 illustrates output audio slices 527–530, showing how the cross-fading functions correspond to those output slices. Waveform 504 represents the output audio waveform after processing.

Fade-out function 515 is applied to source audio data 500 from position marker number 1 to sample 510 (representing the length of one output slice given a speed factor of 1.2). Fade-in function 516 is applied to source audio data 500 from sample 509 through position marker number 2. The results of the application of fade functions 515 and 516 are then combined within output slice 527.

Similarly, in the processing of slice 524, fade-out function 517 is applied to source audio data 500 from position marker number 2 to sample 512 (representing the length of one output slice given a speed factor of 1.2). Fade-in function 518 is applied to source audio data 500 from sample 511 through position marker number 3. The results of the application of fade functions 517 and 518 are then combined within output slice 528. During the processing of slice 524, a request for a speed factor change (from 1.2 to 2.0) is recorded (see control waveform 531), but no speed adjustment action is taken during this slice.

In the processing of slice 525, the new speed factor is taken into account. Fade-out function 519 is applied to source audio data 500 from position marker number 3 to sample 513 (representing the length of one output slice given the new speed factor of 2.0). Fade-in function 520 is applied to source audio data 500 from sample 513 through position marker number 4. The results of the application of fade functions 519 and 520 are then combined within output slice 529.

Likewise, fade-out function 521 is applied to source audio data 500 from position marker number 4 to sample 514 (representing the length of one output slice given a speed factor of 2.0). Fade-in function 522 is applied to source audio data 500 from sample 514 through position marker number 5. The results of the application of fade functions 521 and 522 are then combined within output slice 530.

As shown, the various fade-in and fade-out functions form arches or mounds approximately centered on each position marker and associated transient in the original audio sequence 500. Conceptually, as the speed factor increases, the widths of the mounds become smaller, and the peaks of the mounds get closer together (as can be seen by the overlapping mounds within output slices 527–530). The opposite occurs when the speed factor is reduced.

In embodiments of the invention, speed changes are delayed so as to avoid changing speeds within any mound. Speed changes are recognized when mounds are at a minimum value (i.e., zero), to avoid audible skips. The instantaneous read offset that would normally cause a skip is instead implemented at the beginning of a fade-in, allowing the rest of the fade-in and fade-out of the mound to be completed with a contiguous sequence of samples from the source audio sequence.

In the example of FIG. 5, the speed change is requested during processing of slice 524, but implementation of the speed change is delayed until the next fade-in (520) in slice 525. The mound formed by fade functions 518 and 519 is asymmetrical because the output slice length changes with the speed change in slice 525; however, no read offset is incurred during fade-out 519. This means that fade-out 519 and fade-in 520 use different speeds in calculating output slice 529. This speed difference is imperceptible as it occurs only for a brief time (one slice) and it is cross-faded as usual. The following output slice (530) is fully synchronized.

Application to Time Expansion

The foregoing description of embodiments of the invention applies to speed changes wherein a single cross-fade per slice is sufficient to process the source audio sequence into destination slices. Audio compression (i.e., where the output slice length is smaller than the source audio slice length (speed factor >1.0)) is satisfied by single cross-fades. However, where the speed factor is less than 1.0, the output slice length is larger than the source audio slice length. This means that the source audio data must be expanded in time. While the previously described cross-fading schemes may be used for expansion (e.g., by permitting the fade-in and fade-outs to extend beyond the current slice boundaries), a variety of other expansion methods are also possible.

Expansion methods use a variety of schemes for filling the output slice with more data, such as repeating center portions of source audio slices or extending periods of near silence (where present). Examples or expansion schemes are disclosed in co-pending U.S. patent application Ser. No. 10/407,852, entitled "Method and Apparatus for Expanding Audio Data", filed on Apr. 3, 2003, the disclosure of which is hereby incorporated by reference.

In one or more embodiments of the invention, regardless of the means by which the source audio slice data is expanded, cross-fading is used to blend regions of the slice together. As with time compression, there is an initial fade-out at the beginning of the slice, which, consistent with the foregoing disclosure, is continued in a contiguous fashion from a fade-in at the end of the previous slice. A change in speed does not affect the contiguous nature of this cross-fading "mound" that overlaps slice boundaries. The change in speed is reflected, however, in determining the initial source data offset of each mound used to fill (i.e., expand) the middle portion of the new slice, as well as the source data offset of the fade-in performed at the end of the current slice. Consequently, as with the preceding compression examples, all mounds processed during playback expansion contain contiguous sequences of source data, minimizing clicks and pops associated with skips in the reading of data.

Figure 6:
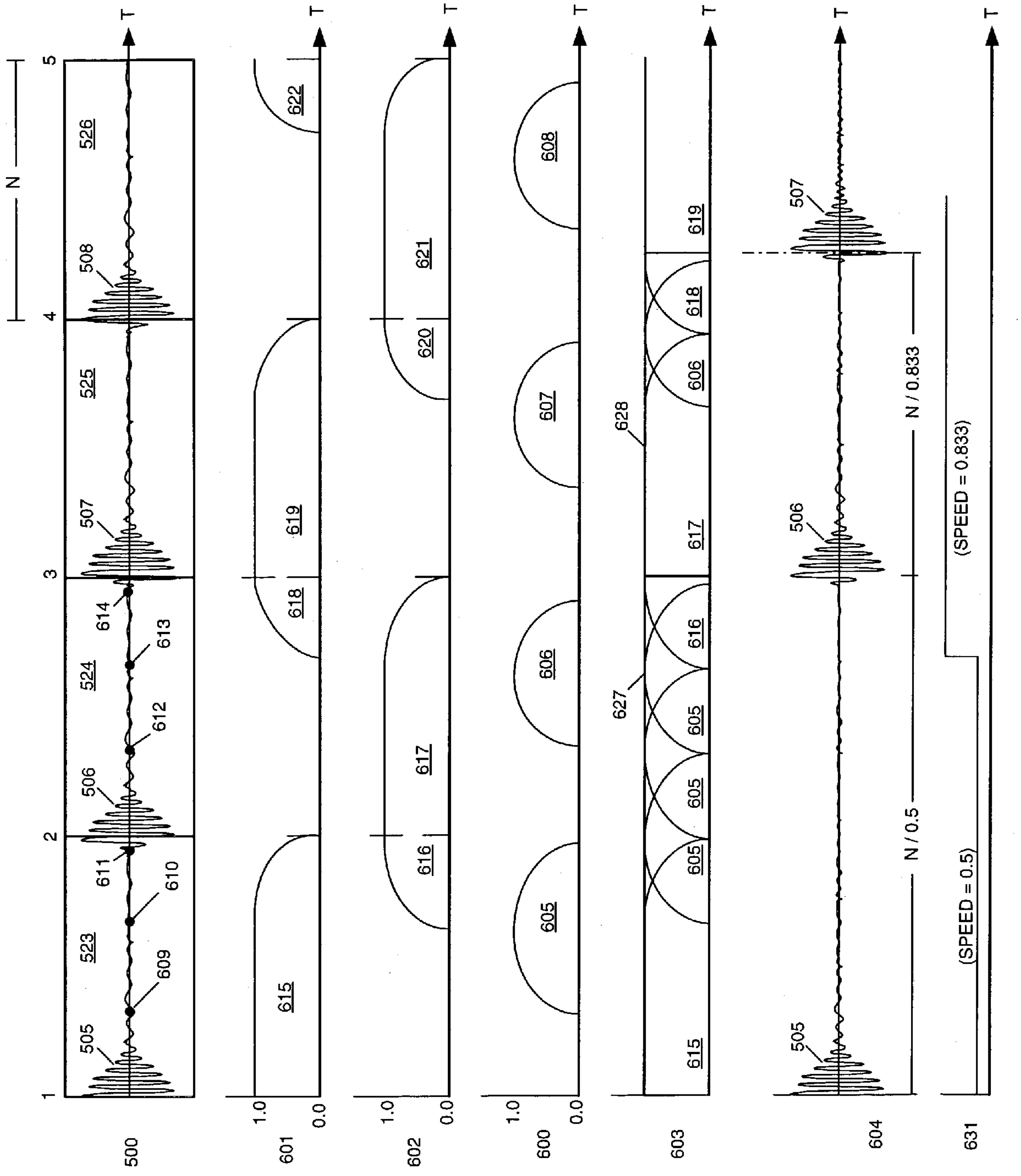
FIG. 6 is a timing diagram illustrating time expansion with a dynamic tempo change during playback of audio data, in accordance with one or more embodiments of the invention.

FIG. 6 illustrates the application of a dynamic tempo change, under time expansion, in accordance with one or more embodiments of the invention. In this example, as shown by speed control waveform 631, the starting speed factor is 0.5, with a speed change input for a speed factor of 0.833 occurring during processing of slice 523. Implementation of the speed change is withheld until processing of subsequent slice 524.

In FIG. 6, waveform 500 represents a source audio data sequence parsed into four slices 523–526 having N samples each. Transients 505–508 are associated with slices 523–526, respectively. Waveforms 600, 601 and 602 illustrate cross-fade functions used to process audio sequence 500. Waveform 603 illustrates output audio slices 627–628, showing how the cross-fading functions correspond to those output slices. Waveform 604 represents the output audio waveform after processing.

Fade-out function 615 is applied to source audio data 500 from position marker number 1 to sample 611, with the region from position marker number 1 to sample 610 at full gain and the region from sample 610 to sample 611 fading from 1.0 to 0.0. Fade-in function 616 is applied to source audio data 500 from sample 610 through position marker number 2, with full fade-in achieved by sample 611. Fill function 605, comprising a fade-in from sample 609 to sample 610 and a fade-out from sample 610 to sample 611, provides a mound of contiguous data from the relatively less significant portion of slice 523 for the purpose of expanding through replication.

The results of the application of functions 615, 616 and 605 are combined as needed to fill output slice 627. In this example, the results corresponding to function 615 combine in a cross-fade with the results from fill function 605. The results of fill function 605 are then repeated (two more times in this example) in a cross-fading manner. The fade-out of the last repetition of fill function 605 is then combined in a cross-fade with the results of function 616 to complete the output slice of the desired length.

Similarly, in the processing of slice 524, fade-out function 617 is applied to source audio data 500 from position marker number 2 to sample 614, with the region from position marker number 2 to sample 613 at full gain and the region from sample 613 to sample 614 fading from 1.0 to 0.0. Fade-in function 618 is applied to source audio data 500 from sample 613 through position marker number 3, with full fade-in achieved by sample 614. Fill function 606, comprising a fade-in from sample 612 to sample 613 and a fade-out from sample 613 to sample 614, provides a mound of contiguous data from the relatively less significant portion of slice 524.

The results of the application of functions 617, 618 and 606 are combined as needed to fill the output slice 628. In this example, the results corresponding to function 617 combine in a cross-fade with the results from fill function 606. The fade-out of the results of fill function 606 is then combined in a cross-fade with the results of function 618 to complete the output slice of the desired length. The speed change that occurred during prior output slice 627 is processed in output slice 628, shortening the output slice length so that only one copy of the results from function 606 are needed to complete the slice.

As with the single cross-fade processing scheme, the starting points for the final fade-in of a slice may vary with changes in the speed factor (i.e., changes in tempo). Further, the starting and ending points of the fill function (as well as the number of fill function replications required) can vary with changes in speed factor. Yet, because the speed change is delayed, and because the first fade-out of a new slice always begins where the final fade-in of the prior slice left off, all source-data read operations are made from contiguous sets of samples. Clicks and pops in the output are thus prevented.

Figure 7:
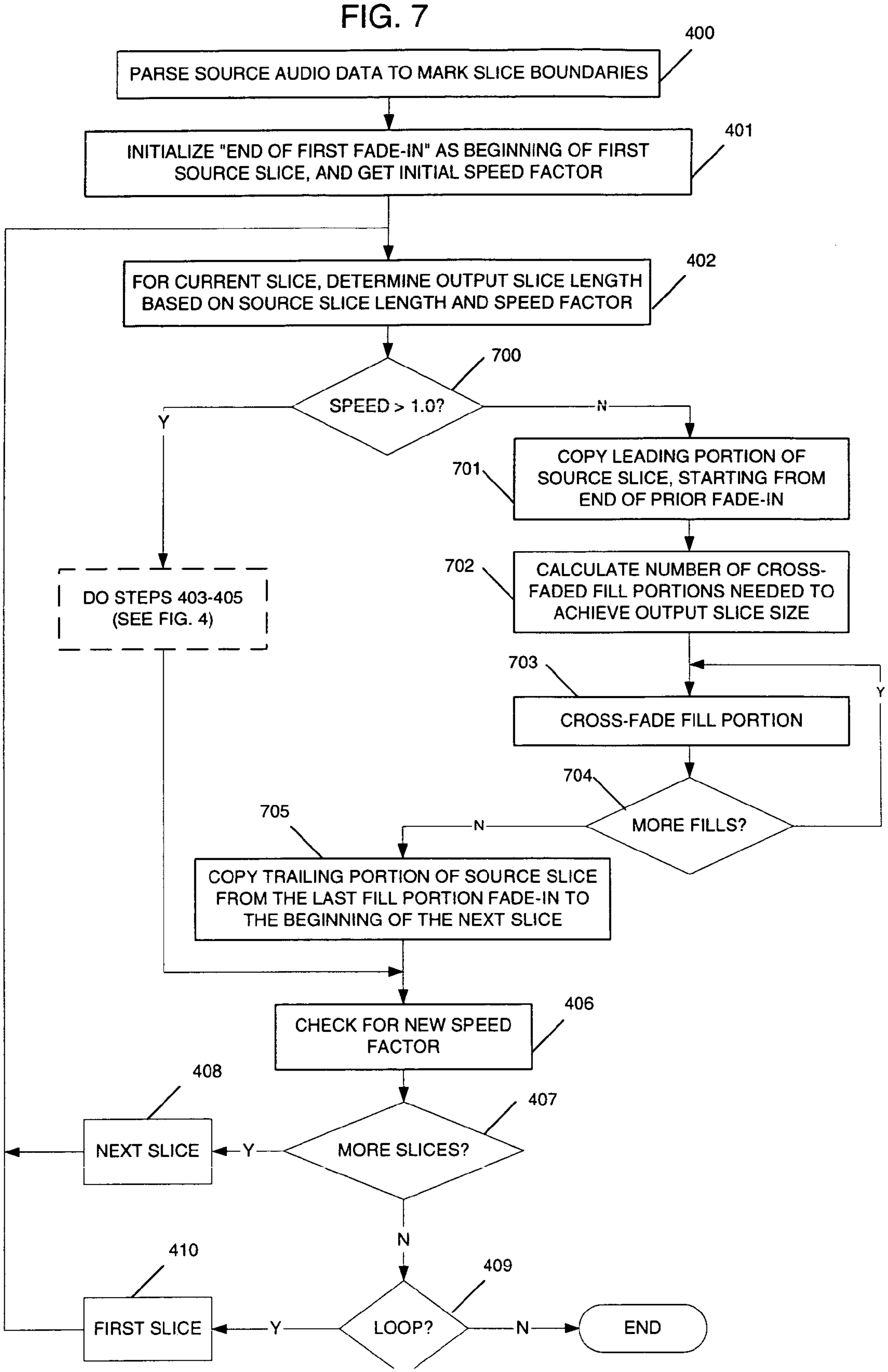
FIG. 7 is a flow diagram illustrating a method for processing audio data with dynamic tempo changes under compression and expansion conditions, in accordance with one or more embodiments of the invention.

FIG. 7 illustrates the flow of a method for time compression and expansion, in accordance with one or more embodiments of the invention. Steps 400–402, as well as steps 406–410 are as described with respect to FIG. 4. However, after step 402 is completed, the present method inserts step 700, wherein it is determined whether time compression or time expansion is appropriate for the current slice. For example, if the speed factor is greater than 1.0, then compression is in order, and steps 403–405 of FIG. 4 are appropriate. If the speed factor is less than 1.0, then expansion begins with step 701.

In step 701, the leading portion of the source slice, starting from the end of the last fade-in, is copied to the output slice without fading. Referring to FIG. 6, the leading portion would be from position marker 1 to sample 610. In step 702, the number of replicated fill portions needed to fill the output slice length is determined. The replicated fill portion comprises the combination of the fade-in portion of function 605 (i.e., sample 609 to sample 610) overlapped with the fade-out portion of function 605 (i.e., sample 610 to sample 611). (Note that the fade-out portion of function 605 matches the fade-out portion of function 615.) Various methods are possible for determining the size of the leading and replicating portions of the slice. One method, for example, uses a best fit analysis to fill an output slice with appropriately sized fill portions.

Steps 703 and 704 form a loop to continue performing cross-fades of the fill portions until the calculated number is reached. Then, in step 705, the trailing portion of the source slice, from the last fade-in of the fill portion to the next position marker, is copied to the output slice. (This corresponds to combining the fade-out of function 605 with the fade-in of function 616, when equal power fade functions are used.) With the slice completed, the flow returns to step 406 to continue as described above with respect to FIG. 4.

By delaying the implementation of a speed change until a following slice, the expected phase of the playback may be offset. Where phase is important, the compression and expansion implementations can be modified to overcompensate for the speed change during the first slice after the change. That is, where the speed factor changes from 1.2 to 2.0, a temporary speed factor of approximately 2.5 may be used in the first slice after the change to jump the phase forward. The speed and phase will thus be appropriate and consistent when the following slice "catches up." One or more embodiments may track the time the change was requested to provide a closer estimate of the temporary speed factor needed.

Processing Environment Example

An embodiment of the invention can be implemented as computer software in the form of computer readable code executed on a general-purpose computer. Also, one or more elements of the invention may be embodied in hardware configured for such a purpose, e.g., as one or more functions of a dedicated audio processing system.

Figure 8:
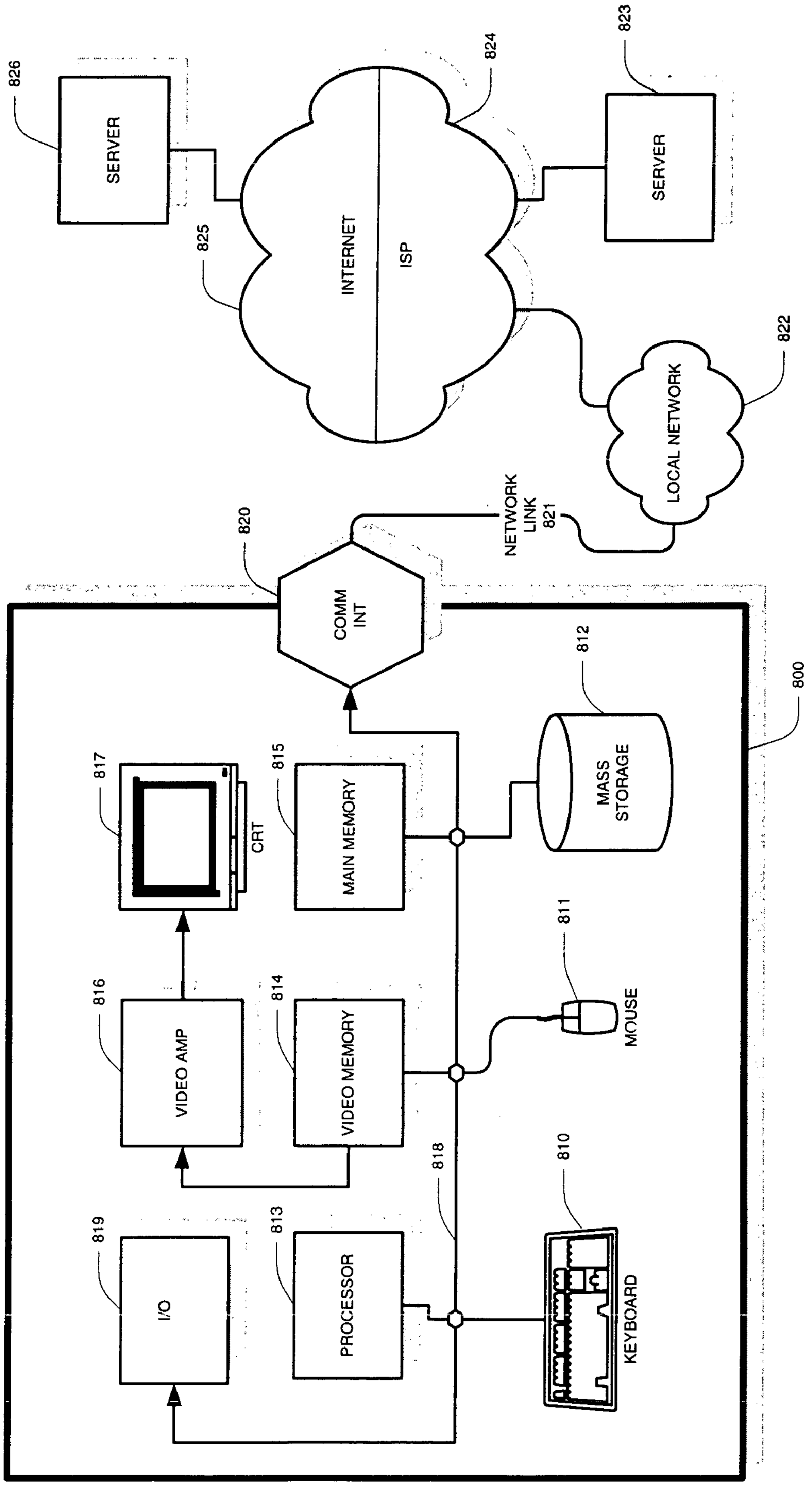
FIG. 8 is a block diagram illustrating an embodiment of an audio processing system in which an embodiment of the invention may be implemented.

An example of a general-purpose computer 800 is illustrated in FIG. 8. A keyboard 810 and mouse 811 are coupled to a bi-directional system bus 818. The keyboard and mouse are for introducing user input to the computer system and communicating that user input to processor 813. Other suitable input devices may be used in addition to, or in place of, the mouse 811 and keyboard 810. I/O (input/output) unit 819 coupled to bi-directional system bus 818 represents such I/O elements as a printer, A/V (audio/video) I/O, etc. Audio input may include a microphone, for example, and audio output may be, for example, a connection to speakers or external audio sound system (not shown). Audio I/O may also be carried out through a MIDI or other standard audio device interface.

Computer 800 includes video memory 814, main memory 815 and mass storage 812, all coupled to bi-directional system bus 818 along with keyboard 810, mouse 811 and processor 813. The mass storage 812 may include both fixed and removable media, such as magnetic, optical or magneto-optical storage systems or any other available mass storage technology that may be used for example, to store audio files that represent input and/or output of an audio application executed by process 813, as well as to store a persistent copy of the audio application itself. Bus 818 may contain, for example, thirty-two address lines for addressing video memory 814 or main memory 815. The system bus 818 also includes, for example, a 64-bit data bus for transferring data between and among the components, such as processor 813, main memory 815, video memory 814 and mass storage 812.

In one embodiment of the invention, the processor 813 is a microprocessor capable of executing computer readable program code such as an audio application. Main memory 815 may comprise, for example, dynamic random access memory (DRAM) that may be used to store data structures for computer program code executed by processor 813. Video memory 814 may be, for example, a dual-ported video random access memory. One port of the video memory 814 is coupled to video amplifier 816. The video amplifier 816 is used to drive the cathode ray tube (CRT) raster monitor 817. Video amplifier 816 is well known in the art and may be implemented by any suitable apparatus. This circuitry converts pixel data stored in video memory 814 to a raster signal suitable for use by monitor 817. Monitor 817 is a type of monitor suitable for displaying graphic images. Alternatively, the video memory could be used to drive a flat panel or liquid crystal display (LCD), or any other suitable data presentation device.

Computer 800 may also include a communication interface 820 coupled to bus 818. Communication interface 820 provides a two-way data communication coupling via a network link 821 to a local network 822. For example, if communication interface 820 is an integrated services digital network (ISDN) card or a modem, communication interface 820 provides a data communication connection to the corresponding type of telephone line, which comprises part of network link 821. If communication interface 820 is a local area network (LAN) card, communication interface 820 provides a data communication connection via network link 821 to a compatible LAN. Communication interface 820 could also be a cable modem or wireless interface. In any such implementation, communication interface 820 sends and receives electrical, electromagnetic or optical signals that carry digital data streams representing various types of information.

Network link 821 typically provides data communication through one or more networks to other data devices. For example, network link 821 may provide a connection through local network 822 to local server computer 823 or to data equipment operated by an Internet Service Provider (ISP) 824. ISP 824 in turn provides data communication services through the data communication network now commonly referred to as the "Internet" 825. Local network 822 and Internet 825 both use electrical, electromagnetic or optical signals that carry digital data streams. The signals through the various networks and the signals on network link 821 and through communication interface 820, which carry the digital data to and from computer 800, are exemplary forms of carrier waves transporting the information.

Computer 800 can send messages and receive data, including program code or audio data files, through the network(s), network link 821, and communication interface 820. In the Internet example, remote server computer 826 might transmit a requested code for an application program through Internet 825, ISP 824, local network 822 and communication interface 820.

The received code may be executed by processor 813 as it is received, and/or stored in mass storage 812, or other non-volatile storage for later execution. In this manner, computer 800 may obtain application code (or data) in the form of a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of audio processing system or audio playback environment.

Thus, a method and apparatus for performing time compression and expansion of audio data, with dynamic tempo change during playback, have been described in conjunction with one or more specific embodiments. The invention is defined by the claims and their full scope of equivalents.

What is claimed is:

1. A method for adjusting tempo of an audio signal comprising:

obtaining a source audio sequence containing source audio data and having a source tempo;

cross-fading a first source slice from said source audio sequence to determine destination audio data for a first output slice having a first output slice length corresponding to a first output tempo;

receiving a request for a second output tempo during said cross-fading of said first source slice;

performing a fade-out of a second source slice using source audio data contiguous with a fade-in from said cross-fading of said first source slice; and performing a fade-in of said second source slice using an offset into said source audio data based on a second output slice length corresponding to said second output tempo.

2. The method of claim 1, further comprising parsing said source audio sequence into a plurality of source slices.

3. The method of claim 2, wherein said parsing comprises:

detecting a plurality of transients; and selecting boundaries of said plurality of source slice based on respective locations of said plurality of transients.

4. The method of claim 2, wherein said parsing comprises:

obtaining information about musical characteristics of said source audio sequence; and determining boundaries of said plurality of source slices based on said musical characteristics.

5. The method of claim 4, wherein said plurality of source slices correspond temporally to musical units of time.

6. The method of claim 5 wherein said musical units are sixteenth notes.

7. The method of claim 1 wherein said plurality of source slices are of varying source slice lengths.

8. A computer program product comprising:

a computer readable storage medium having computer program code embodied therein for adjusting tempo of an audio signal during playback, said computer program code configured to cause a processor to perform a plurality of steps comprising:

obtaining a source audio sequence containing source audio data and having a source tempo;

cross-fading a first source slice from said source audio sequence to determine destination audio data for a first output slice having a first output slice length corresponding to a first output tempo;

receiving a request for a second output tempo during said cross-fading of said first souce slice;

performing a fade-out of a second source slice using source audio data contiguous with a fade-in from said cross-fading of said first source slice; and performing a fade-in of said second source slice using an offset into said source audio data based on a second output slice length corresponding to said second output tempo.

9. The computer program product of claim 8, wherein said plurality of steps further comprise parsing said source audio sequence into a plurality of source slices.

10. The computer program product of claim 9, wherein said parsing comprises:

detecting a plurality of transients; and selecting boundaries of said plurality of source slices based on respective locations of said plurality of transients.

11. The computer program product of claim 9, wherein parsing comprises:

obtaining information about musical characteristics of said source audio sequence; and determining boundaries of said plurality of source slices based on said musical characteristics.

12. The computer program product of claim 11, wherein said plurality of source slices correspond temporally to musical units of time.

13. The computer program product of claim 12 wherein said musical units are sixteenth notes.

14. The computer program product of claim 8 wherein said plurality of source slices are of varying source slice lengths.

15. A method for changing tempo during playback of an audio sequence, comprising:

obtaining an audio sequence having a plurality of source slices of audio data;

associating a fade-in and fade-out mound with each transition between consecutive source slices, said fade-in and fade-out mound containing contiguous audio data from said source audio sequence;

determining output slices of audio data from said source slices by applying cross-fading within each source slice; and in response to a request for a change in tempo, applying said change in tempo at the beginning of a next occurring fade-in.

16. The method of claim 15, wherein said audio sequence comprises a plurality of transients, each of said transients occurring adjacent to a respective transition between consecutive source slices.

17. An apparatus for audio playback comprising:

means for obtaining an audio sequence having a plurality of source slices of audio data;

means for associating a fade-in and fade-out mound with each transition between consecutive source slices, said fade-in and fade-out mound containing contiguous audio data from said source audio sequence;

means for determining output slices of audio data from said source slices by applying cross-fading within each source slice; and means for responding to a request for a change in tempo by applying said change in tempo at the beginning of a next occurring fade-in.

18. A system configured for adjusting tempo of an audio signal, the system comprising:

one or more processors;

memory coupled to said one or more processors;

wherein said memory stores instructions which, when executed by said one or more processors, cause performance of:

obtaining a source audio sequence containing source audio data and having a source tempo;

cross-fading a first source slice from said source audio sequence to determine destination audio data for a first output slice having a first output slice length corresponding to a first output tempo;

receiving a request for a second output tempo during said cross-fading of said first source slice;

performing a fade-out of a second source slice using source audio data contiguous with a fade-in from said cross-fading of said first source slice; and performing a fade-in of said second source slice using an offset into said source audio data based on a second output slice length corresponding to said second output tempo.

19. A system configured for changing tempo during playback of an audio sequence, the system comprising:

one or more processors;

memory coupled to said one or more processors;

wherein said memory stores instructions which, when executed by said one or more processors, cause performance of:

obtaining an audio sequence having a plurality of source slices of audio data;

associating a fade-in and fade-out mound with each transition between consecutive source slices, said fade-in and fade-out mound containing contiguous audio data from said source audio sequence;

determining output slices of audio data from said source slices by applying cross-fading within each source slice; and in response to a request for a change in tempo, applying said change in tempo at the beginning of a next occurring fade-in.

20. A computer program product comprising:

a computer readable storage medium having computer program code embodied therein for adjusting tempo of an audio signal during playback, said computer program code configured to cause a processor to perform a plurality of steps comprising:

obtaining an audio sequence having a plurality of source slices of audio data;

associating a fade-in and fade-out mound with each transition between consecutive source slices, said fade-in and fade-out mound containing contiguous audio data from said source audio sequence;

determining output slices of audio data from said source slices by applying cross-fading within each source slice; and in response to a request for a change in tempo, applying said change in tempo at the beginning of a next occurring fade-in.

21. A computer program product comprising:

a computer readable storage medium having computer program code embodied therein for adjusting tempo of an audio signal, said computer program code configured to cause a processor to perform a plurality of steps comprising:

receiving a request for a tempo change to at least a portion of source audio data, wherein said tempo change is from a first tempo to a second tempo;

performing a fade-out of a next slice of said source audio data contiguous with a fade-in from a current slice of said source audio data; and performing a fade-in of said next slice of said audio data beginning at an offset into said next slice based on said second tempo.

* * * * *